(12) United States Patent
Schmidt et al.

(10) Patent No.: US 8,037,705 B2
(45) Date of Patent: Oct. 18, 2011

(54) TERMINATION FOR A SUPERCONDUCTIVE CABLE

(75) Inventors: Frank Schmidt, Langenhagen (DE); Christian Frohne, Hannover (DE); Nicolas Lallouet, Saint-Martin-Boulogne (FR); Klaus Schippl, Hannover (DE)

(73) Assignee: Nexans, Paris (FR)

( * ) Notice: Subject to any disclaimer, the term of this patent is extended or adjusted under 35 U.S.C. 154(b) by 862 days.

(21) Appl. No.: 11/879,476

(22) Filed: Jul. 17, 2007

(65) Prior Publication Data

US 2010/0029488 A1    Feb. 4, 2010

(30) Foreign Application Priority Data

Aug. 7, 2006  (EP) ..................................... 06291287

(51) Int. Cl.
*F25D 23/12* (2006.01)

(52) U.S. Cl. ....... 62/259.2; 505/885; 505/886; 505/887; 505/888; 174/125.1; 439/207

(58) Field of Classification Search .......... 505/885–888, 505/894; 62/259.2; 174/125.1; 439/207
See application file for complete search history.

(56) References Cited

U.S. PATENT DOCUMENTS

| 4,535,596 A | 8/1985 | Laskaris ........................... 52/45 |
| 4,845,308 A * | 7/1989 | Womack et al. .............. 174/15.4 |
| 2008/0119362 A1 * | 5/2008 | Ashibe et al. ................. 505/211 |

FOREIGN PATENT DOCUMENTS

| EP | 1551038 | 7/2005 |
| WO | WO 03052775 | 6/2003 |
| WO | WO 2006/075443 | * 7/2006 |

* cited by examiner

*Primary Examiner* — Jessica L Ward
*Assistant Examiner* — Paul Wartalowicz
(74) *Attorney, Agent, or Firm* — Sofer & Haroun, LLP

(57) ABSTRACT

A termination for a superconductive cable (1) is provided, consisting of a pressure-tight metal inner container (2) in which there is a liquid refrigerant and into which the cable protrudes, and a metal outer container (3) which is separated from the inner container by an intermediate space (4) in which vacuum insulation is applied. A first rupture diaphragm (6) is applied in the wall of the inner container (2) and a second rupture diaphragm (7) is applied in the wall of the outer container (3) level with the first rupture diaphragm (6). An evacuated relief space (8), which contains superinsulation and is sealed from the intermediate space (4) with the vacuum insulation by a pressure-tight wall (9), is provided between the two rupture diaphragms (6, 7).

4 Claims, 1 Drawing Sheet

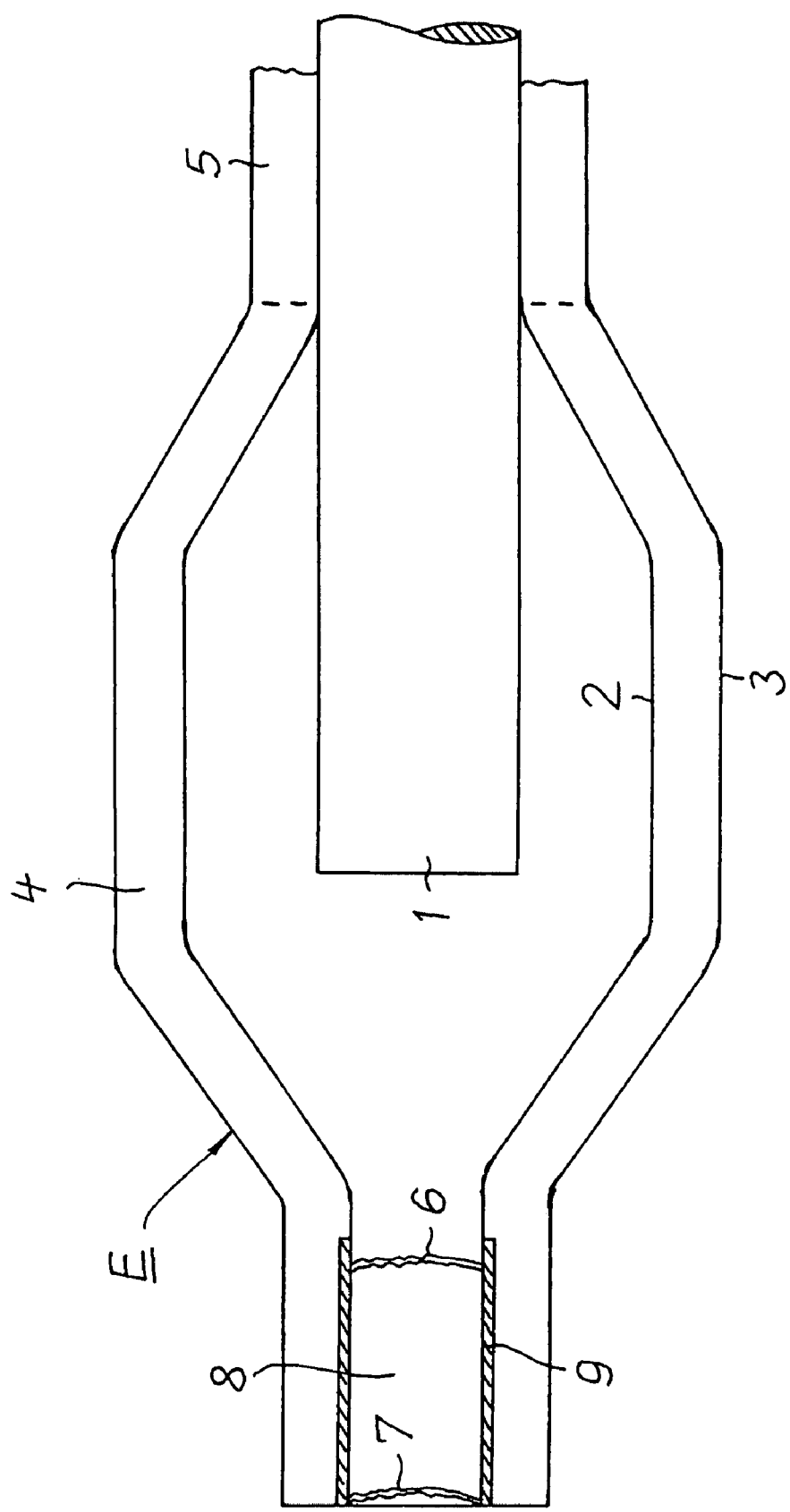

TERMINATION FOR A SUPERCONDUCTIVE CABLE

RELATED APPLICATION

This application claims the benefit of priority from European Patent Application No. 06291278.7, filed on Aug. 7, 2006, the entirety of which is incorporated by reference.

DESCRIPTION

1. Field of the Invention

The invention relates to a termination for a superconductive cable, consisting of a pressure-tight metal inner container in which there is a liquid refrigerant and into which the cable protrudes, and a metal outer container which is separated from the inner container by an intermediate space in which vacuum insulation is applied, wherein a first rupture diaphragm is applied in the wall of the inner container and a second rupture diaphragm is applied in the wall of the outer container level with the first rupture diaphragm (U.S. Pat. No. 4,535,596).

2. Background

A superconductive cable has electrical conductors made of a special material, which enters the superconductive state at sufficiently low temperatures. The electrical resistance of a correspondingly constructed conductor thereby tends towards zero. Suitable materials are for example YBCO (yttrium-barium-copper oxide) or BiSCCO (bismuth-strontium-calcium oxide). Sufficiently low temperatures for such a material to achieve the superconductive state lie, for example, between 67 K and 110 K. Suitable refrigerants are for example nitrogen, helium, neon and hydrogen or mixtures of these substances, respectively in the liquid state. Superconductive cables with a cold dielectric (WO 03/052775 A1) and a warm dielectric (EP 1 551 038 A1) are known.

Irrespective of the structure of the superconductive cable and the system operating with it, it is equipped with a termination at the start and end of a transmission section. This consists of a pressure-tight metal inner container and a metal outer container, which is separated from the inner container by an intermediate space in which vacuum insulation is applied. The superconductive cable protrudes into the inner container that contains a refrigerant, pressurized at least during operation, which is moved during operation of the cable through a cryostat enclosing the cable, or its inner conductor, with the inclusion of an intermediate space. The inner container must thus be dimensioned so that it withstands all possible pressure increases, in particular abrupt pressure increases, without suffering damage.

The risk of such an abrupt pressure increase consists, in a cold-dielectric cable, inter alia in electrical breakdown in the inner container between the superconductive cable and the wall of the inner container or, irrespective of the cable structure, transient processes, for example a short circuit in the mains. If the cable is on the power supply mains, then an extremely heavy current is available for an arc discharge then occurring, which cannot be switched off until after about 0.1 s. The effect of the energy thus introduced is that a large part of the refrigerant contained in the inner container already evaporates. The volume expansion thereby caused in the inner container leads to a transient pressure increase which cannot be dissipated rapidly in the conventional way via pipelines, so that there is a risk that the inner container will burst in the absence of additional measures.

U.S. Pat. No. 4,535,596, cited in the introduction, discloses a termination for a superconductive cable which consists of a pressure-tight metal inner container in which there is a liquid refrigerant and into which the cable protrudes, and a metal outer container which is separated from the inner container by an intermediate space in which vacuum insulation is applied. The vacuum insulation is subdivided by metal heat shields into regions in which there are different refrigerants. A first rupture diaphragm is applied in the wall of the inner container and a second rupture diaphragm is applied in the wall of the outer container level with the first rupture diaphragm. The heat shields of the vacuum insulation also present between the two rupture diaphragms are interrupted by holes in the region of the rupture diaphragms.

OBJECTS AND SUMMARY

It is an object of the invention to protect the inner container of the termination as described in the introduction, as well as the vacuum insulation arranged between the inner container and the outer container, against destruction due to an abrupt pressure increase.

This object is achieved according to the invention in that an evacuated relief space, which contains superinsulation and is sealed from the intermediate space with the vacuum insulation by a pressure-tight wall, is provided between the two rupture diaphragms.

The first rupture diaphragm, which seals the inner container pressure-tightly, is configured so that it opens when a maximum permissible pressure in the inner container is exceeded. As part of the inner container, it delimits the latter's refrigerant-filled interior and is therefore itself strongly cooled in the operational state. The separate evacuated relief space with superinsulation is placed on its outside so that no pressure gradient, which could lead to increased heat input into the inner container, exists between the inside and outside of the first rupture plate. If the pressure in the inner container increases above the permissible maximum pressure and therefore above the threshold pressure of the first rupture diaphragm, in particular abruptly, then the latter opens and releases the content of the inner container initially into the relief space. The second rupture diaphragm, onto which no internal pressure is exerted during unimpaired operation, is configured so that it opens even at a pressure which is much less than the pressure required to open the first rupture diaphragm. It then opens directly after the first rupture diaphragm is opened, because the pressure in the relief space is increased substantially by opening the first rupture diaphragm. In this way, when there is an excessive pressure in the inner container, the liquid or gas emerges therefrom through the openings formed for it. Further damage to the inner container or the termination, and in particular bursting of the termination, is avoided overall.

This is also achieved in particular by the relief space which lies between the two rupture diaphragms and contains superinsulation, and which is sealed by a pressure-tight wall from the intermediate space containing the vacuum insulation. The relief space is a space which is sealed, per se and from the intermediate space delimited between the two containers, by the pressure-tight wall so that a pressure increase occurring after the first rupture diaphragm opens can act only in the direction of the second rupture diaphragm. The vacuum insulation between the two containers of the termination thus remains protected from the bursting process.

BRIEF DESCRIPTION OF THE DRAWINGS

An exemplary embodiment of the subject-matter of the invention is represented in the drawing, the single FIGURE of which shows a schematic representation of a section through a termination for a superconductive cable, or for a system having a superconductive cable.

DETAILED DESCRIPTION

A superconductive cable or cable system, with an arbitrary structure known per se, is denoted by 1. It protrudes into a termination E, which consists of a pressure-tight metal inner container 2 and a metal outer container 3. The outer container 3 is separated from the inner container 2 by an intermediate space 4. The two containers 2 and 3 advantageously consist of stainless steel. The intermediate space 4 is evacuated, and thermal insulation is applied in it. The inner container 2 and the outer container 3 are connected to a cryostat 5 known per se, which encloses the cable 1.

The inner container 2 is sealed by a first rupture diaphragm 6, preferably at its end lying opposite the entry point of the cable 1. In the outer container 3, a second rupture diaphragm 7 sealing the latter is applied approximately at the same level as the first rupture diaphragm 6. Between the two rupture diaphragms 6 and 7, there is a relief space 8 which is sealed from the intermediate space 4 by a pressure-tight wall 9. The relief space 8 is evacuated and comprises superinsulation, consisting for example of many layers of a plastic film evaporation-coated with aluminium. The wall 9 consists, for example, of stainless steel.

The inner container 2 is filled with a liquid refrigerant, for example nitrogen, which at least during operation is at a pressure of for example from 3 bar to 20 bar, as a function of the operating conditions for the cable 1, and is moved through the cryostat 5 belonging to the cable 1 or the associated system during operation thereof.

The two rupture diaphragms 6 and 7 preferably consist of metal, for example steel. They are dimensioned and anchored in the inner container 2 and on the outer container 3, or the wall 9 of the relief space 8, so that they rupture or open when a pressure acting on them is exceeded. An opening is thereby abruptly created in the inner container 2, and immediately thereafter also in the relief space 8, so that the refrigerant can escape from the termination E. The strength of the first rupture diaphragm 6 is substantially greater than that of the second rupture diaphragm 7, since it must ensure pressure-tight sealing of the inner container 2 during unimpaired operation of the cable 1. The first rupture diaphragm 6 should be dimensioned so that it can still withstand a pressure which is at least 10% higher than the pressure prevailing in the inner container 2. The second rupture diaphragm 7 may already open at substantially lower pressures, which lie for example between 1 and 5 bar.

The relief space 8 with its superinsulation ensures that the function of the first rupture diaphragm 6 is not compromised by external effects. By the relief space 8, the first rupture diaphragm 6 is isolated from the ambient temperature of the termination E so that no temperature gradient exists between its inside on the one hand and its outside on the other hand. At the same time, the heat input into the inner container 2 at the site of the first rupture diaphragm 6 is greatly reduced in this way.

The relief space 8 is in turn a space which is sealed, per se and from the intermediate space 4 delimited between the two containers 2 and 3, by the pressure-tight wall so that a pressure increase occurring after the first rupture diaphragm 6 opens can act only in the direction of the second rupture diaphragm 7. To this end the wall 9 must be configured so that it withstands higher pressures than the second rupture diaphragm 7 without suffering damage, in order that the pressure increase occurring in the relief space 8 after opening of the first rupture diaphragm 6 only causes the second rupture diaphragm 7 to open.

For instance, the following takes place in the event of a fault with an abrupt pressure increase in the inner container 2:

When an excessive pressure abruptly occurs in the inner container 2, for example owing to a breakdown between the cable 1 and the inner container 2, then the first rupture diaphragm 6 opens. It opens into the relief space 8, so that the second rupture diaphragm 7 also opens immediately thereafter. Both containers 2 and 3 as well as the vacuum insulation lying between them, in the intermediate space 4, are thus preserved without suffering damage. The liquid emerging from the termination E, or the gas emerging therefrom, is first captured in an environmentally friendly fashion, for example in a gravel bed. The gas may subsequently escape into the atmosphere.

The invention claimed is:

1. Termination for a superconductive cable comprising:
   a pressure-tight metal inner container in which there is a liquid refrigerant and into which the cable protrudes: and
   a metal outer container which is separated from the inner container by an intermediate space, said intermediate space being evacuated, wherein a first rupture diaphragm seals said inner container at a side opposite where said cable protrudes into said inner container and a second rupture diaphragm seals said outer container, on the same side as said first diaphragm and level with the first rupture diaphragm, wherein an evacuated relief space, which contains superinsulation and is sealed from the intermediate space with the vacuum insulation by a pressure-tight wall, is provided between the two rupture diaphragms, wherein said first and second rupture diaphragms are dimensioned to irreversibly rupture in the event that pressure within said inner container for said first rupture diaphragm and within said intermediate space for said second rupture diaphragm exceeds first and second predetermined thresholds respectively.

2. The termination as claimed in claim 1, wherein said first rupture diaphragm ruptures at a pressure greater than the pressure required to rupture said second rupture diaphragm.

3. The termination as claimed in claim 2, wherein the first rupture diaphragm is dimensioned so that it can withstand a pressure which is at least 10% higher than pressure prevailing within said inner container.

4. The termination as claimed in claim 2, wherein the second rupture diaphragm is configured to break under pressures between 1 and 5 bar.

* * * * *